United States Patent [19]
Gabbert

[11] Patent Number: 4,595,747
[45] Date of Patent: Jun. 17, 1986

[54] VISCOSIFIED LACTAM POLYMERIZATION INITIATOR SOLUTIONS

[75] Inventor: James D. Gabbert, Wilbraham, Mass.

[73] Assignee: Monsanto Company, St. Louis, Mo.

[21] Appl. No.: 682,718

[22] Filed: Dec. 17, 1984

[51] Int. Cl.$^4$ .............................................. C08G 69/20
[52] U.S. Cl. .................................... 528/319; 525/420; 525/431; 525/432; 525/434; 528/312; 528/315; 528/323
[58] Field of Search ............... 528/319, 312, 315, 323; 525/420, 432, 431, 434

[56] References Cited

U.S. PATENT DOCUMENTS 3,862,262  1/1975  Hedrick et al. ..................... 260/857
4,031,164  6/1977  Hedrick et al. ..................... 525/420

FOREIGN PATENT DOCUMENTS 0067695  12/1982  European Pat. Off.

Primary Examiner—Harold D. Anderson
Attorney, Agent, or Firm—Nancy J. Linck; R. Bruce Blance; William J. Farrington

[57] ABSTRACT

Compositions for the preparation of block copolylactams comprising lactam, lactam polymerization initiator and an effective amount of a viscosity enhancing compound selected from the group consisting of the lactamates and ω-amino acid salts of barium, calcium and strontium.

35 Claims, No Drawings

VISCOSIFIED LACTAM POLYMERIZATION INITIATOR SOLUTIONS

The present invention is directed to lactam solutions of lactam polymerization initiator coreactant and to their use in the preparation of nylon block copolymers and is directed more particularly to such lactam solutions containing viscosifiers for improved processability.

In the preparation of a nylon block copolymer, an initiator coreactant containing activated —N— lactam groups or a precursor thereof is typically dissolved in a lactam monomer. The addition of an appropriate catalyst to the solution of lactam and lactam polymerization initiator coreactant or precursor thereof yields a system which can be poured into a mold and polymerizes to form a shaped article of nylon polymer. A particular type of nylon copolymer is disclosed in U.S. Pat. No. 4,031,164 issued to Hedrick and Gabbert, June 21, 1977. It has been found in the preparation of nylon block copolymers that when the viscosity of the lactam solution of lactam polymerization initiator coreactant or precursor thereof is low the resulting molded article may be defective due to the formation of bubbles by the entrapment of air during the molding process. It has been further observed that when the solution is foamed to prepare a nylon foam, the prior entrapment of air associated with the low viscosity can cause polymer foam instability, particularly when the polymer is molded in a reaction injection molding process.

It is therefore desirable to increase the viscosity of the solution of lactam polymerization initiator coreactant or precursor thereof to such a degree that the potential for forming bubbles in nylon block copolymers produced therefrom, or the potential for forming destabilizing foams of such nylon block copolymers is significantly reduced. The present invention provides a method of increasing the viscosity of the lactam solution of lactam polymerization initiator coreactant by the addition of a barium, calcium or strontium viscosifier material.

The present invention is directed to a composition comprising a lactam, a lactam polymerization initiator coreactant containing an activated N-substituted lactam group and an effective amount of a viscosity enhancing compound selected from the group consisting of barium, calcium, and strontium lactamates and $\omega$-amino acid salts wherein the lactam polymerization initiator is a telechelic oligomer or polymer containing at least one activated N-substituted lactam group and comprises a backbone which provides elastomeric segments in a nylon block copolymer produced therefrom by lactam addition polymerization.

The present invention further pertains to nylon block copolymers prepared from these viscous compositions and to the method of making such copolymers from the viscous compositions.

The lactam polymerization initiator coreactant useful for the practice of the present invention are telechelic oligomers or polymers containing at least one, and preferably at least two lactam groups per molecule bonded to the oligomer or polymer through the nitrogen atom of the lactam ring, each lactam group being activated by adjacent electron withdrawing groups to allow them to initiate lactam polymerization in the presence of a lactam polymerization catalyst. Such adjacent groups include

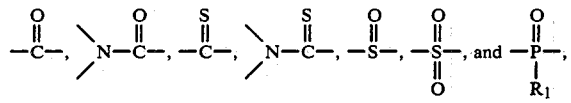

wherein $R_1$ is selected from the group consisting of alkyl, aryl, aralkyl, alkyloxy, aryloxy or aralkyloxy groups. The backbone of the telechelic oligomer or polymer is selected to provide "soft", elastomeric segments in the nylon block copolymer while the polylactam segments produced by addition polymerization of the lactam monomer onto the initiator provides "hard" or crystalline segments. Suitable backbone oligomers or polymers can be polyethers such as polyalkylene ethers, polyhydrocarbons such as polyalkenes, alkene copolymers, polyalkadienes and alkadiene copolymers, polyesters containing polyalkylene or polyalkylene ether segments, and polysiloxanes such as poly(dimethylsiloxanes). They are characterized by their ability, when they are present in the nylon block copolymer in an amount of at least 50 weight percent, to impart to the block copolymer a tensile recovery, of at least about 50 percent. Tensile recovery is determined on a dry, as molded, sample of polymer elongated 50% of its initial length (1) and held for 10 minutes before release of tension. Ten minutes after release the length of the sample ($1_r$) is remeasured. The percentage recovery is $$\frac{(1.5\,l - l_r)}{.5\,l} \times 100.$$

While, for the purpose of such characterization, at least 50 weight percent of elastomeric segments must be present in the block copolymer, it should be appreciated that the amount of elastomeric segments in the nylon block copolymers prepared by the process of the present invention, is not limited to at least 50 percent since lower and higher amounts in the range of 10 to 90 weight percent also impart improved properties to the nylon polymer. Suitable polyether backbones are the various polyalkyleneoxides such as polyethyleneoxides, polypropyleneoxides and poly(tetramethyleneoxides). Examples of suitable polymeric hydrocarbons are the various polyalkenes and polyalkadienes and alkaldiene copolymers such as polyethylene, polypropylene, and polybutadiene and copolymers of butadiene and acrylonitrile. Examples of suitable polyesters are those prepared by reacting polyether polyols such as polyoxypropylene polyol or polyoxyethylene polyol with polyfunctional acid halides such as terephthaloyl chloride so as to form a polyesterether or reacting a polymeric hydrocarbon polyol such as polybutadiene diol with a polyfunctional acid halide such as terephthaloyl chloride so as to form a polyesterhydrocarbon. Examples of suitable polysiloxanes are silicon polycarbinol and polydimethylsiloxane diols and polyols.

Advantageously, the lactam polymerization initiator coreactant is a telechelic oligomer or polymer having a number average molecular weight from about 500 to about 15,000, and preferably, from about 1,000 to about 10,000. Preferred lactam polymerization initiators are those derived from polyethers having molecular weights of at least about 1,000 and, preferably, from about 2,000 to about 6,000 and those derived from polymeric hydrocarbons, polyesters or polysiloxanes having molecular weights of at least 1,000 and, preferably, from about 2,000 to about 5,000. All references herein to molecular weight shall mean number average molecular weight which is determined by methods well known in the art.

The concentration of activated N-lactam groups provided by the lactam polymerization initiator coreactant and present during the polymerization of lactam monomer will affect the overall reaction rate. The total amount of activated N-lactam groups present in the polymerization mixture may be varied by means of the functionality and/or the concentration of lactam polymerization initiator present in the mixture. Generally, the functionality or number of activated N-lactam groups, i.e. equivalents, per molecule of the lactam polymerization initiator used to prepare the nylon block copolymers is at least one. Preferably, the number is at least about 2 per molecule, more preferably, from about 2 to about 10 per molecule and, still more preferably, from about 3 to about 6 per molecule. As is known to those skilled in the art, the reaction rate will also be dependent upon the concentration of catalyst being used and other parameters such as the temperature at which the reaction is being carried out.

A preferred lactam polymerization initiator coreactant is represented by the formula

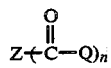

wherein Z is a polyvalent radical of equivalence n which provides an elastomeric segment when it is incorporated into a lactam copolymer, n is an integer in the range of 2 to 9 and Q is a lactam residue bonded to the carbonyl through the nitrogen atom of the lactam. Such initiators are advantageously prepared by reacting the acid halide

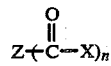

where x is chlorine or bromine, with lactam monomer.

One particularly preferred lactam polymerization initiator coreactant which provides viscosified solutions according to the present invention is represented by the formula:

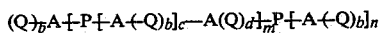

wherein P is a polyvalent radical of equivalence n+1, which provides an elastomeric segment when it is incorporated into a lactam copolymer and n is an integer in the range of 1 to 7, wherein A is a polyvalent radical of equivalence b+1 selected from the group consisting of

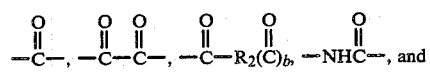

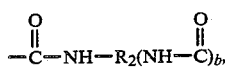

b is in the range of 1 to 3 and $R_2$ is a polyvalent substituted or unsubstituted hydrocarbyl or hydrocarbyl ether radical of molecular weight in the range of about 28 to 300, wherein Q is a residue of ε-caprolactam or 2-pyrrolidinone, bonded to the A radical through the nitrogen atom of the lactam, wherein m is in the range of 0 to 5, c=n−1 and d=b−1, and wherein the number of Q residues per average molecule is in the range of from 2 to 10. The A radical represented by the formula

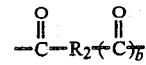

is especially preferred. m-Phenylene and p-phenylene are especially preferred $R_2$ radicals.

Such especially preferred lactam polymerization initiators are advantageously prepared by the reaction of one equivalent of hydroxy polymer, selected from the group consisting of polyether polyols, polymeric hydrocarbon polyols, polyester polyols containing only polyester segments or polyester and polyether segments or polyester and hydrocarbon segments and polysiloxanes, with two equivalents of a $C_4$ to $C_{20}$ polyfunctional acid halide in the presence of an acid scavenger and the subsequent reaction with lactam monomer. However the equivalent ratio of hydroxy polymer to acid halide may be selected greater or less than 1:2 to provide oligomeric lactam polymerization initiators with backbones containing alternating P and A segments. For example when the hydroxy polymer is trifunctional and the acid chloride is difunctional, an equivalent ratio of 3:5 may be used to advantage to provide an oligomeric tetrafunctional acid halide. Among the preferred $C_4$ to $C_{40}$ acid halides are terephthaloyl chloride and isophthaloyl chloride. It should be noted, however, that those skilled in the art will recognize that these particularly preferred lactam polymerization initiators may be prepared by other routes. The above referred to "P" segments preferably conform to the molecular weight limitations discussed above generally for polyethers, polymeric hydrocarbons, polyesters and polysiloxanes.

The lactam polymerization initiator coreactant is effective in initiating the anionic polymerization of a $C_3$ to $C_{12}$ lactam in the presence of a suitable lactam polymerization catalyst. Preferably the lactam is a $C_4$ to $C_8$ lactam and is more preferably ε-caprolactam.

In accordance with the present invention, the viscosity of the solution of the lactam polymerization initiator in lactam used to prepare the nylon block copolymer is increased by adding an effective amount of a calcium, strontium or barium compound selected from the group consisting of $C_3$ to $C_{12}$ lactamates and $C_3$ to $C_{12}$ ω-aminoacid salts of the formula:

$R_3$—M—$R_3$ wherein M is calcium, strontium or barium,

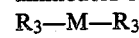

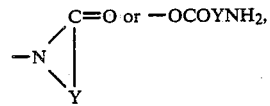

$R_3$ is
and wherein Y is a $C_2$ to $C_{11}$ polymethylene radical. The preferred $R_3$ group is

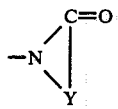

and the preferred Y groups are trimethylene and pentamethylene which provide the metal pyrrolidinonates or bis(2-oxo-1-pyrrolidinyl) metals and the metal caprolactamates, or bis(2-oxo-1-hexahydroazepinyl)metals.

The viscosity enhancing barium, calcium and strontium compounds used in the present invention may be prepared by any known means. Generally, they are prepared by reacting barium, calcium or strontium compounds such as the respective hydrides, oxides, hydroxides, alkoxides, carbonates, alkyls, or amides with a lactam monomer so as to form the respective barium, calcium or strontium lactamate. Preferably, the hydroxide or oxide form of barium, calcium or strontium is reacted with a lactam so as to form the preferred viscosifier material.

The amount of barium, calcium or strontium viscosity enhancing material added to a lactam solution of the lactam polymerization initiator will vary, depending upon the concentration of the particular solution and the viscosity which the user desires to achieve. It is believed that, without undue experimentation, one skilled in the art can determine the appropriate amount of barium, calcium, or strontium compound necessary to achieve a desired viscosity for a given lactam solution of lactam polymerization initiator. Generally, an effective amount of the barium, calcium, or strontium compound is added to the solution so as to significantly increase the viscosity of the composition. By significantly increasing the viscosity of the composition it is meant that in comparing two similar compositions, the composition to which the barium, calcium or strontium compound is added will have at least a 10 percent increase in viscosity and preferably at least a two-fold increase in viscosity over the composition containing no viscosity enhancing compound. Viscosities are determined by means of a Brookfield viscometer in accordance with procedures known to those skilled in the art. Preferably, the minimum amount of barium, calcium or strontium viscosity enhancing compound added to a lactam solution of a lactam polymerization initiator is at least about 0.02 equivalent per equivalent of polymerization initiator and, more preferably, from about 0.05 to about 0.10 equivalent.

Upon the addition of a specific amount of viscosifier material to a lactam solution of a lactam polymerization initiator the viscosity increases to a point and then levels off and remains at about this particular viscosity for a long time. This viscosity increase in the lactam polymerization initiator solution is apparently not due to addition polymerization of lactam monomer to the lactam groups of the initiator as would occur in the presence of a catalyst. This will be demonstrated below, specifically in Examples 5 and 6 wherein a comparison is made between magnesium pyrrolidinonate, (bis(2-oxo-1-pyrrolidinyl)magnesium), a catalyst for lactam polymerization and barium pyrrolidinonate, (bis(2-oxo-1-pyrrolidinyl)barium, a viscosity enhancing material of the present invention. The magnesium pyrrolidinonate catalyzes addition polymerization of lactam monomer to the initiator and the viscosity continues to increase until the solution becomes solid. In contradistinction, in the solution to which the barium pyrrolidinonate is added, the increase in viscosity levels off and the solution remains liquid. Furthermore, in Example 7, a lactam polymerization initiator solution in a nonpolymerizable lactam to which barium pyrrolidinonate is added demonstrates similar viscosity behavior, showing that some mechanism other than polymerization is responsible for the increase in viscosity.

While the mechanism for the viscosity increase is not definitely known, it is theorized that the mechanism involves ionic or covalent bridging of molecules of lactam polymerization initiator through the nitrogen atoms of their lactam groups by barium, calcium or strontium ions or atoms. However, this theory should not be taken in any manner to limit the scope of the present invention.

As discussed above, when the lactam solvent is polymerizable, the lactam solution of the lactam polymerization initiator containing the barium, calcium or strontium viscosity enhancing compound is useful for the preparation of a nylon block copolymer by the reaction of the activated N-lactam groups of the initiator material with the lactam monomer in the presence of a suitable catalyst. This may be achieved by various means known to those skilled in the art. One particular method involves bringing the initiator solution into reactive admixture with an appropriate lactam polymerization catalyst by mixing the two. The catalyst is typically a magnesium or sodium catalyst, more preferably, a magnesium catalyst and, still more preferably, a halide magnesium lactamate. The polymerization temperature is generally from about 70° C. to about 230° C., preferably about 90° C. to about 190° C. and, more preferably, about 120° C. to about 180° C.

One particular method of preparing a nylon block copolymer from a polymerizable lactam solution of a lactam polymerization initiator and a barium, calcium or strontium viscosity enhancing compound in accordance with the present invention, is by a reaction injection molding process, accomplished by injecting the initiator solution and a solution of catalyst into a mold via an impingement type mixer which results in the lactam polymerization being initiated and completed in the mold. By this method, the polymerization of the lactam monomer may be completed within a short period of time such as from about 30 seconds to about 4 minutes, depending upon the concentration of initiator and catalyst used. Generally, it is desirable to use a minimum of about 18 weight percent of lactam polymerization initiator based upon the total weight of the lactam monomer and initiator used in preparing the nylon block copolymer and, more preferably, from about 20 weight percent to about 80 weight percent initiator based upon the total weight of lactam monomer and initiator. One skilled in the art, without undue experimentation, would be able to adjust the amount of lactam polymerization initiator used to prepare a nylon block copolymer in order to obtain desired properties and be able to adjust the functionality and concentration of the initiator and the concentration of the catalyst so as to initiate and complete the polymerization within any desired time limit.

The examples which follow are set forth to illustrate the invention and are not intended to limit its scope. All parts and percentages are by weight unless indicated otherwise.

EXAMPLES 1-3

The Examples 1-3 demonstrate preparation of barium, calcium and strontium lactamates using 2-pyrrolidinone as the lactam, and the use of the lactamates to increase the viscosity of a composition of lactam polymerization initiator in caprolactam. Viscosities were determined with a Brookfield Model HAT viscometer using a No. 4 Brookfield disc spindle revolving at 100 revolutions per minute (rpm). Furthermore, the lactam polymerization initiator used for each example to demonstrate the enhancement of viscosity by addition of the lactamates was a poly(acyl lactam) prepared from a polyoxypropylene triol as follows:

A clean, dry flask was charged with 2.0 moles of a polyoxypropylene triol (2000 molecular weight). The flask was purged with nitrogen and subsequently charged with 5.05 moles terephthaloyl chloride. To this mixture 3500 ml of tetrahydrofuran was added and the mixture was stirred until the triol and acid chloride had dissolved. A second flask was charged with 6.1 moles of triethylamine and 900 ml tetrahydrofuran. This solution was added slowly to the above mixture of triol, acid chloride, and tetrahydrofuran over a 30 to 60 minute period with the temperature maintained below 50° C. When addition was complete, the mixture was agitated for 3 hours at ambient temperature.

A third flask was charged with 4.26 moles caprolactam, 4.1 moles triethylamine, and 1000 ml tetrahydrofuran. This solution was added to the above reaction mixture over a 30 to 60 minute period. After addition was complete, the mixture was heated to reflux the tetrahydrofuran over a 60 minute period. The mixture was cooled to about 30° C. and 100 gms of Flectol H (an antioxidant) was added. The mixture was filtered, and tetrahydrofuran was distilled from the filtrate by raising the temperature to 95° C. When the rate of distillation slowed, the pressure was carefully reduced to a vacuum of less than 1 torr. The liquid residue was cooled to 35° C. and placed into storage jars.

A composition of the above prepared poly(acyl lactam) initiator material in caprolactam was prepared by adding a sufficient amount of the poly(acyl lactam) initiator to previously dried caprolactam so as to prepare a composition containing 44 weight percent of the poly(acyl lactam).

EXAMPLE 1

Preparation of Barium Pyrrolidinonate Solution

A 500 ml flask was charged with 200 ml of xylene and 35 gms (0.228 mols) of barium oxide. This mixture was then refluxed at a pot temperature of 135° C. to 145° C. and 39.6 gms (0.465 mols) of 2-pyrrolidinone was added in a drop-wise fashion over a 20 minute period. During the addition of the 2-pyrrolidinone, 4 ml of water was removed from the refluxing mixture in a Dean-Stark azeotrope trap. After the addition of the 2-pyrrolidinone, the mixture was refluxed at about 145° C. for an additional hour. The total amount of water removed from the mixture was 4.9 ml. The mixture was filtered to yield a solid barium pyrrolidinonate [bis(2-oxo-1-pyrrolidinyl)barium]. The dried solids yield was 59.3 gms.

Viscosification of a Polyacyl Lactam Initiator Composition

A flask was charged with 300 gms of the poly(acyl lactam) initiator composition in caprolactam and heated to 130° C. To this composition the above prepared barium pyrrolidinonate was added in incremental amounts. The cumulative amount added after each addition is given below in Table I with the respective Brookfield viscosity determination obtained after the viscosity had increased to its steady value.

TABLE I

EFFECT OF BARIUM PYRROLIDINONATE ON THE VISCOSITY OF CAPROLACTAM-INITIATOR SOLUTION

| Barium Pyrrolidinonate (gms) | Initiator Solution Brookfield Viscosity (cps) |
|---|---|
| 0 | 60 |
| 1.5 | 180 |
| 2.22 | 660 |
| 2.52 | 1,280 |
| 2.65 | 5,000 |
| 2.94 | >22,000 |

EXAMPLE 2

Preparation of Barium Pyrrolidinonate Solution

A 500 ml flask which was equipped with a reflux condenser and a Dean-Stark azeotrope trap was charged with 56 gms (0.326 mols) of barium hydroxide and 250 ml of cyclohexane. The mixture was azeotroped to remove traces of water. To this mixture, 58.1 gms (0.683 mols) of 2-pyrrolidinone was added in a drop-wise fashion over a 40 minute period while the mixture was maintained at a pot temperature of 81° C. An additional 50 cc of cyclohexane was added to the mixture and azeotropic reflux was continued for a 3½ hour period. The resulting slurry was filtered and yielded solid barium pyrrolidinonate. The dried solids yield was 97.9 gms. The solids were dissolved in ε-caprolactam to give a solution containing 1 mole per kg.

Viscosification of the Poly(Acyl Lactam) Solution

A flask was charged with 250 gms of the lactam solution of poly(acyl lactam) initiator solution. To this solution 3.86 gms of the barium pyrrolidinonate solution was added giving a stable Brookfield viscosity at 130° C. of 25,000 cp.

EXAMPLE 3

Preparation of Calcium Pyrrolidinonate Solution

A 50 ml flask was charged with 3.7 gms (0.05 mols) of calcium hydroxide and 21 gms (0.247 mols) of 2-pyrrolidinone. The mixture was heated to 240° C. with nitrogen bubbled through the liquid suspension for 60 minutes. The suspension disappeared, giving rise to a translucent solution. To this solution 20 gms of previously dried ε-caprolactam was added. Excess 2-pyrrolidinone was removed from the solution by distilling off 22 gms of material. The resulting solution theoretically contained 2.2 moles of calcium pyrrolidinonate per kilogram of material.

Viscosification of the Poly(Acyl Lactam) Solution

A flask was charged with 150 gms of the poly(acyl lactam) solution. To this composition 3.11 gms of the calcium pyrrolidinonate solution of Example 3 was added to provide a Brookfield viscosity of 1600 cps at 130° C.

EXAMPLES 4,5

The following Examples 4 and 5 demonstrate that the viscosifier material of the present invention does not react via a polymerization reaction of the lactam monomer. This is demonstrated by comparing first, in Example 4, the use of a viscosifier material, (barium pyrrolidinonate), in accordance with the present invention with a known lactam polymerization catalyst, magnesium pyrrolidinonate [bis(2-oxo-1-pyrrolidinyl) magnesium].

A 3-liter flask which was equipped with a stirrer, nitrogen inlet tube, thermocouple and vacuum distilling head was charged with 1320 gms of an acyl lactam terminated polyoxypropylene polyether as prepared above for Examples 1–3 and 1705 gms caprolactam. This mixture was dried by distilling off 25 mls of material under <1 torr vacuum. To this mixture, a 0.96 molar solution of barium pyrrolidinonate in caprolactam which was prepared in a manner similar to that described for Example 2 was added incrementally. The total amount after each addition is set forth in Table 2. After each addition the resulting viscosity was determined at 130° C. with a Brookfield HAT viscometer using a No. 4 spindle disc at 100 rpm. The viscosities are listed below in Table 2.

TABLE 2
EFFECT OF BARIUM PYRROLIDINONATE ON THE VISCOSITY OF LACTAM POLYMERIZATION INITIATOR SOLUTION

| Barium Pyrrolidinonate Solution (gms) | Initiator Solution Viscosity (cps) |
|---|---|
| 0 | 44 |
| 12 | 52 |
| 18 | 92 |
| 24 | 196 |
| 30 | 524 |
| 36 | 1700 |

After the final addition of barium pyrrolidinonate so that the composition contained 36 gms 0.96 molar solution, the composition was stirred for an additional 90 hours at 130° C. after which time the measured viscosity was 1400 cps.

EXAMPLE 5

Example 4 above was repeated with the only difference being that magnesium pyrrolidinonate was used instead of barium pyrrolidinonate, 2.3 gms of magnesium pyrrolidinonate solution (1 mole per kg of ε-caprolactam) were added to 300 gms of the acyl lactam initiator solution. The composition which was being stirred at 130° C. set into a hard resin within 15 minutes after the addition of the magnesium pyrrolidinonate.

The above Examples 4 and 5 demonstrate that the viscosifier material of the present invention does not catalyze polymerization in the manner of a catalyst such as magnesium pyrrolidinonate. Examination of Example 4 illustrates that the viscosity of the solution remained constant after the final addition of barium pyrrolidinonate, in comparison to Example 5 wherein the mixture set into a hard resin within 15 minutes after the addition of magnesium pyrrolidinonate.

EXAMPLE 6

The following example further exemplifies that the viscosifier material of the present invention does not act via a polymerizing reaction of lactam monomer.

A barium pyrrolidinonate solution was prepared according to the procedure of Example 3 by dissolving 6 gms (0.019 moles) barium pyrrolidinonate, in 34 gms (0.4 moles) of 2-pyrrolidinone. The concentration of the solution is 0.5 mole per kg solution.

A lactam polymerization initiator composition was prepared by dissolving 160 gms of the acyl lactam terminated polyoxypropylene polyether, prepared according to the procedure of Examples 1–3, into 160 gms of 1-methyl-2-pyrrolidinone to provide a 50/50 poly(acyl lactam) solution. To the poly(acyl lactam) solution, the barium pyrrolidinonate solution was added in incremental amounts as indicated below in Table 3. After each incremental addition, the resulting mixture was stirred for 30 minutes at 130° C. and the viscosity was measured with a Brookfield HAT viscosimeter using a No. 2 disc spindle at 5 to 100 rpms. The viscosities are set forth below in Table 3.

TABLE 3
VISCOSITY ENHANCEMENT OF POLY(ACYL LACTAM)/ 1-METHYL-2-PYRROLIDINONE SOLUTION

| Barium Pyrrolidinonate Solution (gms) | 1-Methyl-2-pyrrolidinone Solution Brookfield Viscosity (23° C./cps) |
|---|---|
| 0 | 159 |
| 6.0 | 196 |
| 12.2 | 309 |
| 18.1 | 647 |
| 24.0 | 1507 |
| 30.1 | 2800 |
| 36.2 | 4128 |

EXAMPLES 7 & 8

Examples 7 and 8 demonstrate the preparation of a viscosifier material using ε-caprolactam in place of pyrrolidinone.

EXAMPLE 7

Preparation of Calcium Caprolactamate Solution

A 50 ml flask was charged with 0.63 gms (0.0085 mols) calcium hydroxide and 17 gms (0.15 mols) of ε-caprolactam. The mixture was heated to about 220° C. while nitrogen was bubbled through the mixture for about 20 minutes. The mixture which was initially an opaque slurry turned translucent. The resulting solution theoretically contained 0.5 moles of calcium caprolactamate [bis(2-oxo-1-hexahydroazepinyl)calcium] per kilogram.

Viscosification of the Poly(Acyl Lactam) Solution

A sample of the polyacyl lactam functional material composition prepared as described above for Examples 1–3 was heated to 130° C. To this composition 30.5 gms of the above prepared calcium caprolactamate solution was added. The resulting Brookfield viscosity increased from 60 to 1300 cps.

EXAMPLE 8

Preparation of Barium Caprolactamate Solution

A 500 ml flask equipped with a stirrer, Dean-Stark azeotrope trap and a reflux condenser was charged with 35 gms (0.2 moles) anhydrous barium hydroxide, 172.5 gms (1.53 moles) ε-caprolactam, and 100 ml of xylene. This mixture was heated to 160° C. and refluxed for 30 hours with the water evolved during the reaction removed and isolated in the azeotrope trap. A total of 3 ml of water was removed which is 41 percent of theoretical. The xylene was removed by stripping under an oil pump vacuum of 10 torr for 30 minutes to yield a solution containing 1 mole of barium caprolactamate per kilogram (kg) of solution.

Viscosification of Lactam Polymerization Initiator Solution

A 150 ml flask was charged with 43 gms of the poly(acyl lactam) terminated polyoxypropylene polyether of Examples 1–3 and 43 gms of 1-methyl2-pyrrolidone at a temperature of 22° C. The initial Brookfield viscosity was 162 cps. To this mixture 3 ml of the barium solution of Example 9 was added. The Brookfield viscosity increased to 504 cps. A second 3 ml addition of the solution raised the viscosity to 96,400 cps.

EXAMPLE 9
Preparation of Strontium Pyrrolidinonate Solution

A 500 ml flask was charged with 26.6 gms (0.1 mole) strontium hydroxide octahydrate and 200 ml xylene. This mixture was heated to 160° C. and refluxed for 30 hours. 13 ml water was isolated in an azeotrope trap.

To this refluxing mixture 30 ml of 2-pyrrolidinone was added over a 70 minute period and an additional 2.7 ml of water was removed. An additional 60 ml of 2-pyrrolidinone was added to the mixture over the next 20 minutes. 110 ml of the xylene was removed by distillation, the pot temperature being increased to 155° C. The mixture was refluxed at 155° C. for an additional 13.5 hours to remove a total of 17.9 ml of water. The resulting translucent solution was then cooled to 30° C. and the remaining xylene was removed by vacuum distillation with the pot temperature raised to 80° C. Subsequently, the mixture was cooled to room temperature. Yield of solution in the pot was 97.5 gms. Theoretically, the solution contained 1 mole strontium pyrrolidinonate per Kg of pyrrolidinone solution.

Viscosification of Lactam Polymerization Initiator solution

A test tube was charged with 16 gms caprolactam and 13.5 gms of the poly(acyl lactam) polyoxypropylene polyether used in Examples 1–3. The mixture was stirred and heated to 130° C. while a stream of dry nitrogen was bubbled through it. To this composition 0.5 gms of the above prepared strontium pyrrolidinonate solution was added. Within 15 minutes, the viscosity of the solution increased from 60 to 5000 cp.

EXAMPLE 10

This example demonstrates the preparation of a nylon block copolymer using a lactam polymerization initiator solution viscosified in accordance with the present invention.

Preparation of Viscosified Lactam Polymerization Initiator Solution

A 500 ml flask equipped with stirrer, thermometer, nitrogen inlet tube and vacuum distilling head was charged with 89 gms of a poly(acyl lactam) terminated polyoxypropylene polyether as prepared in Examples 1–3 above and 136 gm caprolactam. The mixture was stirred and heated under <1 torr to distill off 25 ml caprolactam at a pot temperature of 125° C. and obtain an anhydrous solution. The vacuum was released to dry nitrogen and the temperature adjusted to 130° C. While the mixture was stirred, there was added 1 gm of barium 2-pyrrolidinonate solution in caprolactam containing 0.93 moles barium per Kg, prepared in accordance with the procedure of Example 2. The viscosity of the initiator solution increased from 50 to 300 cps.

Preparation of Catalyst Solution

In a second flask, a catalyst solution was prepared by diluting 329 gms of a 1.05 molar solution of caprolactam magnesium bromide in ε-caprolactam with 1171 gms anhydrous caprolactam.

Preparation of Nylon Block Copolymer

Equal volumes of the above prepared viscosified polyacyllactam initiator solution and catalyst solution were pumped into a vertical mold previously heated at 130° C. (Mold dimensions were 8"×8"×⅛") The composition and solution were pumped into the mold by means of two #5 Zenith gear pumps with the separate streams mixed by pumping through a ¼" Kenics static mixer prior to introduction into the mold.

The mixture in the mold set into a hard mass within 80 seconds with the finished polymerized casting removed from the mold 120 seconds after mixing and pumping into the mold.

The nylon block polymer casting prepared in Example 10 was tested for various properties substantially in accordance with the procedures listed below. The results are listed in Table 4 below:

| | | |
|---|---|---|
| Tensile Strength: | ASTM D1703 | [units are pounds per square inch (psi) or megapascals (MPa)] |
| Flexural Modulus: | ASTM D790 | [units are pounds per square inch (psi) or megapascals (MPa)] |
| Tensile Elongation: | ASTM D638 | [units in %] |
| Notched Izod Impact | ASTM D256 | [units are foot-pounds per inch notch (ft.lbs./in.) or joules per meter (J/m)] |

TABLE 4

| | |
|---|---|
| Tensile Strength PSI (MPa) | 7080 (48.8) |
| Tensile Elongation - % | 196 |
| Tensile Recovery - % | 34 |
| Flexural Modulus PSI (MPa) | 236,000 (1627) |
| Izod Impact Strength ft-lbs/in (J/m) | 11.7 (624) |

It should be noted that while the above examples illustrate the present invention using a poly(acyl lactam) derived from a polyether that other lactam polymerization initiators derived from other compounds including those containing segments other than polyether segments can be substituted in the above examples to obtain the viscosity enhancing effect of the barium, calcium or strontium viscosifier materials.

I claim:

1. A composition comprising a lactam monomer, a lactam polymerization initiator coreactant and an effective amount of a viscosity enhancing compound selected from the group consisting of the lactamates and ω-amino acid salts of barium, calcium, and strontium, wherein the lactam polymerization initiator coreactant is a telechelic oligomer or polymer containing at least one activated N-substituted lactam group and comprises a backbone which provides elastomeric segments in a nylon block copolymer produced therefrom by lactam addition polymerization.

2. The composition of claim 1 wherein the amount of the viscosity enhancing compound is at least about 0.02 equivalent per equivalent of lactam polymerization initiator coreactant.

3. The composition of claim 1 wherein the amount of viscosity enhancing compound is from about 0.05 to about 0.1 equivalent of lactam polymerization initiator coreactant.

4. The composition of claim 1 wherein the viscosity enhancing compound is selected from the group consisting of bis(2-oxo-1-pyrrolidinyl)calcium, bis(2-oxo-1-pyrrolidinyl)strontium, bis(2-oxo-1pyrrolidinyl)barium, bis(2-oxo-1-hexahydroazepinyl)calcium, bis(2-oxo-1-hexahydroazepinyl)strontium, and bis(2-oxo-1-hexahydroazepinyl)barium.

5. The composition of claim 1 wherein the polymerization initiator coreactant comprises at least two activated lactam groups per molecule.

6. The composition of claim 1 wherein the initiator coreactant comprises from 3 to 6 activated lactam groups per molecule.

7. The composition of claim 6 wherein the lactam polymerization initiator coreactant is of number average moleular weight from about 500 to about 15,000.

8. The composition of claim 5 wherein activation of the lactam groups of the initiator coreactant is provided by adjacent electron withdrawing groups selected from the group consisting of

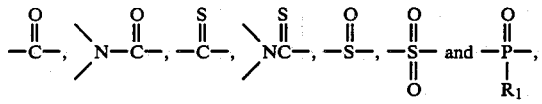

where $R_1$ is selected from the group consisting of alkyl, aryl, aralkyl, alkyloxy, aryloxy or aralkyloxy groups.

9. The composition of claim 5 wherein the initiator coreactant is represented by the formula

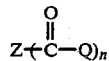

wherein z is the backbone moiety of equivalence n, wherein n is in the range of 2 to 10 and wherein Q is a lactam residue bonded to the carbonyl group through the nitrogen of the lactam.

10. The composition of claim 5 wherein the initiator coreactant is represented by the formula

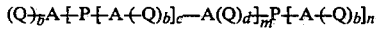

wherein P is a polyvalent radical of equivalence n+1, which provides an elastomeric segment when it is incorporated into a lactam copolymer and n is an integer in the range of 1 to 7, wherein A is a polyvalent radical of equivalence b +1 selected from the group consisting of

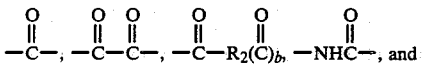

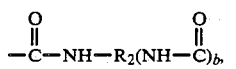

b is an integer in the range of 1 to 3 and $R_2$ is a polyvalent substituted or unsubstituted hydrocarbyl or hydrocarbyl ether radical of molecular weight in the range of about 28 to 300, wherein Q is a residue of ε-caprolactam or 2-pyrrolidinone bonded to the A radical through the nitrogen atom of the lactam, wherein m is in the range of 0 to 5, wherein c=n−1 and d=b−1, and wherein the number of Q residues per average molecule is in the range of 2 to 10.

11. The composition of claim 10 wherein the A radical is

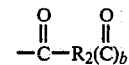

and $R_2$ is m-phenylene or p-phenylene.

12. The composition of claim 10 wherein the P radical is a polyether, a polyester-ether, a polyesterhydrocarbon, a polymeric hydrocarbon, a polysiloxane, or mixtures thereof.

13. The composition of claim 10 wherein the P radical is derived from a hydroxy polymer selected from the group consisting of polyether polyols, polymeric hydrocarbon polyols, or polysiloxane polyols of molecular weight of at least about 1000.

14. The composition of claim 10 wherein the P radical is a polyether having a molecular weight from about 2000 to about 6000 or a polymeric hydrocarbon having a molecular weight from about 2000 to about 5000.

15. The composition of claim 1 wherein the lactam monomer is ε-caprolactam.

16. The composition of claim 9 wherein the lactam monomer is ε-caprolactam and Q is a residue of ε-caprolactam or 2-pyrrolidinone.

17. The composition of claim 10 wherein the lactam monomer is ε-caprolactam.

18. A process of preparing a nylon block copolymer, which comprises
(a) preparing a first reactant stream by admixing a solution of a lactam polymerization initiator coreactant in a polymerizable lactam monomer and an effective amount of a viscosity enhancing compound selected from the group consisting of the lactamates and ω-amino acid salts of barium, calcium and strontium;
(b) preparing a second reactant stream by dissolving a lactam polymerization catalyst in the polymerizable lactam monomer; and
(c) admixing the first and second reactant streams and allowing polymerization to occur; wherein the lactam polymerization initiator coreactant is a telechelic oligomer or polymer containing at least one activated N-substituted lactam group and comprises a backbone which provides elastomeric segments in the nylon block copolymer.

19. The process of claim 18 wherein the amount of the viscosity enhancing material is at least about 0.02 equivalent per equivalent of lactam polymerization initiator coreactant.

20. The process of claim 18 wherein the amount of viscosity enhancing material is from about 0.05 to about 0.1 equivalent per equivalent of lactam polymerization initiator coreactant.

21. The process of claim 18 wherein the viscosity enhancing compound is selected from the group consisting of bis(2-oxo-1-pyrrolidinyl)calcium, bis(2-oxo-1-pyrrolidinyl)strontium, bis(2-oxo-1-pyrrolidinyl)barium, bis(2-oxo-1-hexahydroazepinyl)calcium, bis(2-oxo-1-hexahydroazepinyl)strontium, and bis(2-oxo-1-hexahydroazepinyl)barium.

22. The process of claim 18 wherein the polymerization initiator coreactant comprises at least two activated lactam groups per molecule.

23. The process of claim 18 wherein the lactam polymerization initiator coreactant is of number average molecular weight from about 500 to about 15,000.

24. The process of claim 18 wherein activation of the lactam groups is provided by adjacent electron withdrawing groups selected from the group consisting of

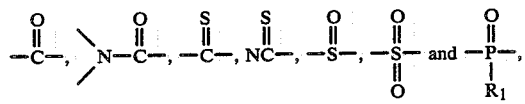

where $R_1$ is selected from the group consisting of alkyl, aryl, aralkyl, alkyloxy, aryloxy or aralkyloxy groups.

25. The process of claim 22 wherein the initiator coreactant is represented by the formula

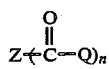

wherein Z is the backbone moiety of equivalence n, wherein n is in the range of 2 to 10 and wherein Q is a lactam residue bonded to the carbonyl group through the nitrogen of the lactam.

26. The process of claim 22 wherein the initiator coreactant is represented by the formula

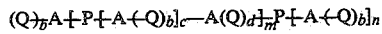

wherein P is a polyvalent radical of equivalence n+1, which provides an elastomeric segment when it is incorporated into a lactam copolymer and n is an integer in the range of 1 to 7, wherein A is a polyvalent radical of equivalence b+1 selected from the group consisting of

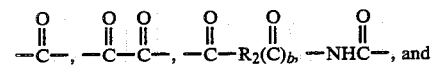

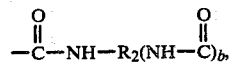

b is an integer in the range of 1 to 3 and $R_2$ is a polyvalent substituted or unsubstituted hydrocarbyl or hydrocarbyl ether radical of molecular weight in the range of about 28 to 300, wherein Q is a residue of ε-caprolactam or 2-pyrrolidinone bonded to the A radical through the nitrogen atom of the lactam, wherein m is 0 or 5, wherein c=n−1 and d=b−1, and wherein the number of Q residues per average molecule is in the range of from 2 to 10.

27. The process of claim 26 wherein the A radical is

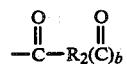

and $R_2$ is m-phenylene or p-phenylene.

28. The process of claim 26 wherein the P radical is a polyether, a polyester-ether, a polyester-hydrocarbon; a polymeric hydrocarbon, a polysiloxane or mixtures thereof.

29. The process of claim 26 wherein the P radical is derived from a hydroxy polymer selected from the group consisting of polyether polyols, polymeric hydrocarbon polyols, or polysiloxane polyols of molecular weight of at least about 1000.

30. The process of claim 26 wherein the P radical is a polyether having a molecular weight from about 2000 to about 6000 or a polymeric hydrocarbon having a molecular weight from about 2000 to about 5000.

31. The process of claim 18 wherein the lactam polymerization catalyst is a magnesium or sodium catalyst.

32. The process of claim 18 wherein the polymerization is carried out at a temperature in the range of about 120° C. to about 180° C.

33. The process of claim 18 wherein the lactam monomer is ε-caprolactam.

34. The process of claim 25 wherein the lactam monomer is ε-caprolactam and Q is a residue of ε-caprolactam or 2-pyrrolidinone.

35. The process of claim 27 wherein the lactam monomer is ε-caprolactam.

* * * * *